US008494975B2

(12) United States Patent
Lee et al.

(10) Patent No.: US 8,494,975 B2
(45) Date of Patent: Jul. 23, 2013

(54) METHOD AND TOOL FOR ESTIMATING A SHIP DATE PROFILE FOR A BUSINESS

(75) Inventors: Young Min Lee, Old Westbury, NY (US); Stephen John Buckley, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 10/879,350

(22) Filed: Jun. 30, 2004

(65) Prior Publication Data

US 2006/0004620 A1    Jan. 5, 2006

(51) Int. Cl.
*G06Q 99/00* (2006.01)
(52) U.S. Cl.
USPC ........... 705/330; 705/331; 705/332; 705/333; 705/337
(58) Field of Classification Search
USPC .......... 705/1, 330, 331, 332, 333, 337; 703/6, 703/8
See application file for complete search history.

(56) References Cited

U.S. PATENT DOCUMENTS

| 6,167,380 | A | 12/2000 | Kennedy et al. ................ 705/10 |
| 6,188,989 | B1 | 2/2001 | Kennedy ............................ 705/8 |
| 6,463,345 | B1 | 10/2002 | Peachey-Kountz et al. .... 700/99 |
| 7,031,801 | B1 * | 4/2006 | Hodge et al. .................. 700/213 |
| 7,035,815 | B1 * | 4/2006 | Henson ........................... 705/26 |
| 7,693,748 | B1 * | 4/2010 | Mesaros .......................... 705/26 |
| 2002/0069082 | A1 * | 6/2002 | Choe et al. ........................ 705/1 |
| 2002/0161674 | A1 * | 10/2002 | Scheer ............................. 705/28 |
| 2003/0028420 | A1 * | 2/2003 | DeBiasse ........................ 705/10 |
| 2007/0203770 | A1 * | 8/2007 | Grosvenor et al. ............... 705/7 |
| 2010/0205044 | A1 * | 8/2010 | Scheer ............................ 705/10 |

FOREIGN PATENT DOCUMENTS

EP    658841 A2 *  6/1995

OTHER PUBLICATIONS

Marilyn K. McClelland, "Using Simulation to Facilitate Analysis of Manufacturing Strategy," Journal of Business Logistics, vol. 13, No. 1, pp. 215-237, 1992.
Saku Hieta, "Supply Chain Simulation with LOGSIM-Simulator," Proceedings of the 1998 Winter Simulation Conference, pp. 323-326, 1998.
Sugato Bagchi, et al., "Experience Using the IBM Supply Chain Simulator," Proceedings of the 1998 Winter Simulation Conference, pp. 1387-1394, 1998.
Shang-Tae Yee, "Establishment of Product Offering and Production Leveling Principles via Supply Chain Simulation Under Order-to-Delivery Environment," Proceedings of the 2002 Winter Simulation Conference, pp. 1260-1268, 2000.

* cited by examiner

*Primary Examiner* — Akiba Allen
(74) *Attorney, Agent, or Firm* — Daniel P. Morris; McGinn IP Law Group, PLLC

(57) ABSTRACT

A method and tool for estimating a ship date profile for a business (e.g., a business that is not in operation), includes simulating a plurality of dynamic events to estimate the ship date profile for the business. The plurality of dynamic events may include, for example, at least one of stochastic customer shopping traffic, an uncertainty of order size, a customer preference of a product feature and demand forecast, an inventory policy, a sourcing policy and a supply planning policy, and a manufacturing lead time.

29 Claims, 5 Drawing Sheets

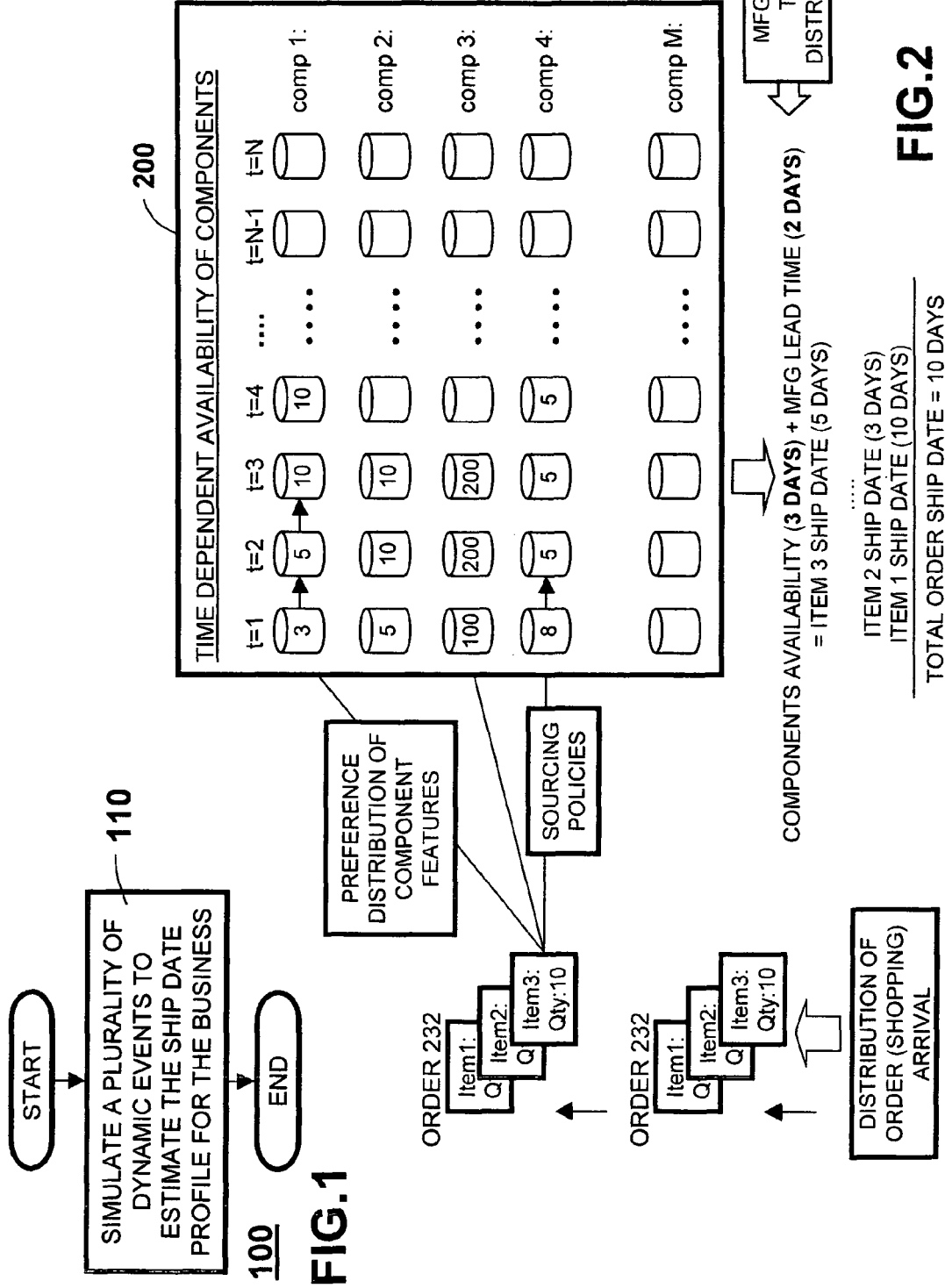

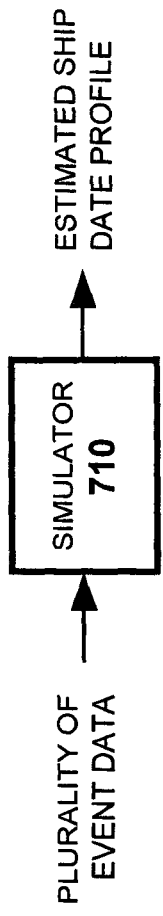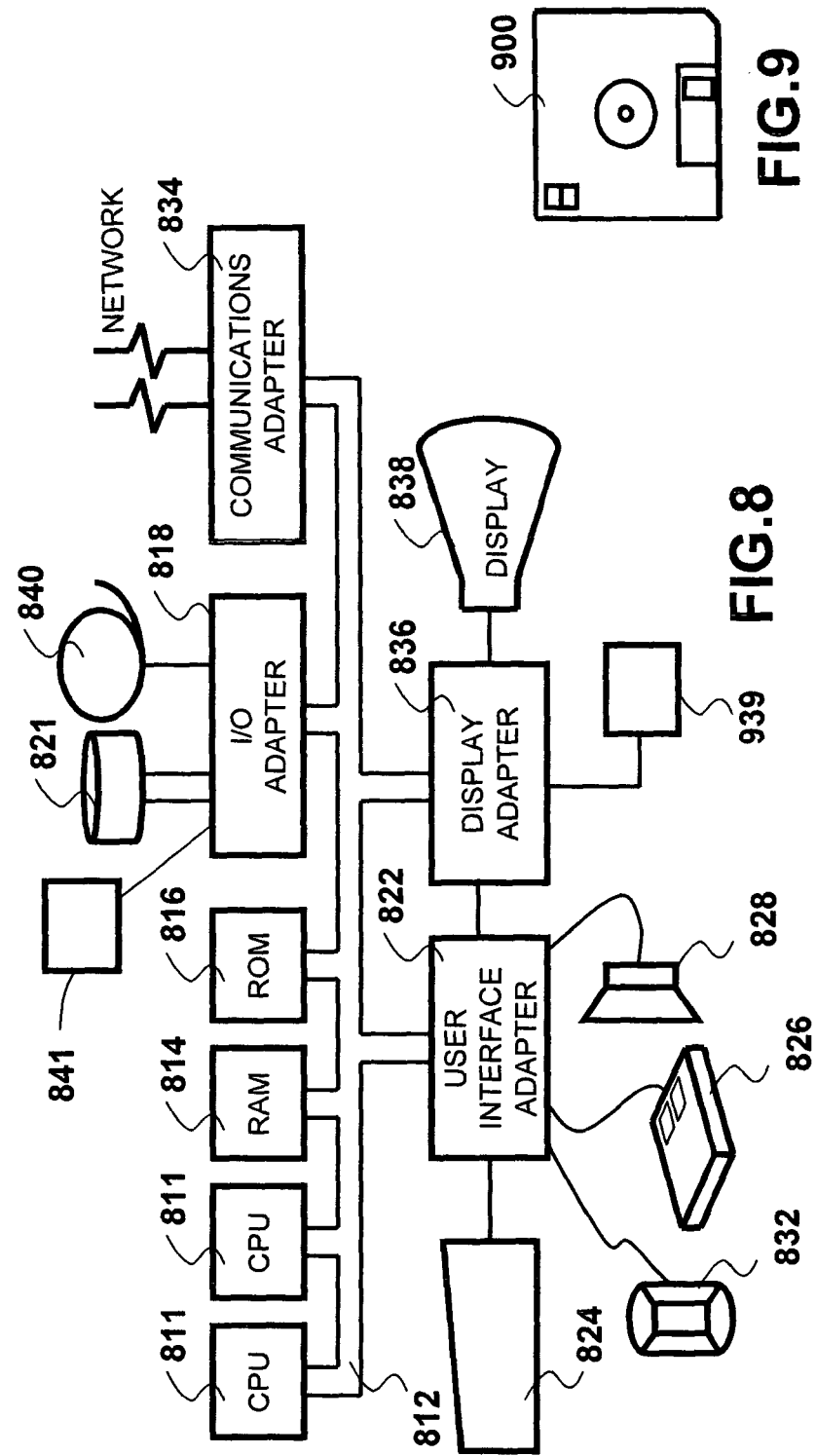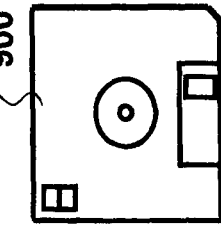

METHOD AND TOOL FOR ESTIMATING A SHIP DATE PROFILE FOR A BUSINESS

BACKGROUND OF THE INVENTION

1. Field of the Invention

The present invention relates to a method and tool for estimating a ship date profile and, more particularly, a method and tool which estimates a ship date profile by simulating a plurality of dynamic events.

2. Description of the Related Art

In a business (e.g., e-commerce businesses, such as Web-based business) which sells or leases a product (e.g., computers, furniture, automobiles, appliances etc.), where the customer may select one or more features (e.g., options) to be included in the product, providing a customer with the desired lead time-to-shipment (e.g., a number of days for the product to be shipped after the order is placed) and actually shipping the product on time is an important factor in determining the success or failure of the business in today's competitive market. The lead time-to-ship date may be determined and provided to a customer in multiple times during the customer's shopping (e.g., e-shopping) process.

For businesses that are already in operation, when customers inquire about the ship date, or place an order, the ship date is typically calculated by an availability checking computer tool such as ATP (Available-to-Promise) system by checking a master production schedule (MPS), inventory of the products and components, orders, forecasted product quantity, committed quantity, allocated inventory quantity, demand prioritization, and applying various ATP policies such as allocation policies, promising policies and other business rules etc. At least one supply chain management software company, i2, and the assignee of the present application have several patents on the ATP methods and systems.

However, for businesses that have not been in operation yet, such as when a new business is planned, a business transformation is planned or a business environment is expected to change, it is difficult to accurately estimate the profiles of the expected ship dates, such as a mean, range, standard deviation, skew and its change over time etc., because the required data sources do not exist and there are many uncertainties in the business. Since the ship date is directly related to customer service, it is very important to accurately project the ship date profile before a new business process or its change is implemented.

Discrete-event simulation has been around for several decades to simulate stochastic behaviors of materials, services and information flow etc. in analyzing processes of manufacturing, services and various business operations. Especially, supply chain management (SCM) has been one of the areas where a simulation method has been used to evaluate its effectiveness. Most of such usage has been to investigate inventory levels and customer service performance based on various manufacturing and distribution scenarios, and policies in inventory, manufacturing, replenishment and transportation.

However, there presently exist no simulation method or tool that estimates a ship date profile (e.g., determines an expected ship date) for a business (e.g., in a virtual e-commerce business environment), such as a business that is not yet in operation, or a business that is not yet selling or leasing the product (e.g., a product for which actual data is not available for determining a ship date profile).

SUMMARY OF THE INVENTION

In view of the foregoing and other exemplary problems, disadvantages, and drawbacks of the aforementioned methods and tools, it is a purpose of the exemplary aspects of the present invention to provide a method and tool for estimating a ship date profile for a business.

Presently, there exist no simulation method or tool that estimates a ship date profile (e.g., determines an expected ship date) for a business by considering (e.g., simultaneously) factors such as stochastic behaviors of customer order, supply, demand forecast, product configuration, efficiency of data communication, and various business rules and policies.

The exemplary aspects of the present invention include a method (e.g., a computer-implemented method) of estimating a ship date profile for a business, which includes simulating a plurality of dynamic events to estimate the ship date profile (e.g., an expected ship date profile) for the business. The plurality of dynamic events may include, for example, at least one of stochastic customer shopping traffic, uncertainty of order size, customer preference of a product feature and demand forecast, an inventory policy, a sourcing policy and a supply planning policy, and manufacturing lead time. The method may further include estimating an accuracy of the ship date profile.

Further, the business may include a business which is not in operation at a time of simulating the plurality of dynamic events. In addition, the ship date profile may include a ship date profile for a product that is not being one of sold and leased by the business at a time of simulating the plurality of dynamic events. Further, simulating the plurality of dynamic events may include using only data from event simulation (e.g., simulating the plurality of events) to estimate the ship date profile. That is, the present invention may rely solely upon estimated data and does not necessarily require the use of actual (e.g., empirical) shipping data in order to estimate a ship date profile for the business (e.g., a ship date profile for a particular product).

In addition, the business may include a traditional brick-and-mortar business or an e-commerce (e.g., online) business. Further, for an online business, the plurality of dynamic events may also include a frequency of data communications between computer systems supporting the e-commerce business.

Further, the business may include a non-existing business and the plurality of dynamic events may be estimated by appropriate probability distribution functions using best judgment. The business may include, for example, a business in which a customer selects at least one feature of a product which is at least one of sold and leased by the business.

Further, simulating the plurality of dynamic events may include simulating an effect of the plurality of dynamic events on a ship date profile. A ship date (e.g., an expected ship date) may include, for example, an expected ship date for one of a partial shipment and a total shipment.

Further, simulating the plurality of dynamic events may include using (e.g., generating and using) a business model for the business. In this case, the method may also include updating the business model by replacing estimated data associated with the plurality of dynamic events with actual event data, such that an accuracy of the ship date profile for the business improves as the business model evolves. The method may also include updating the business model by feeding back data associated with a previously estimated ship date profile and/or an actual business operation into a next simulation of the plurality of dynamic events.

Further, simulating the plurality of dynamic events may include forming a multi-dimensional array having entries including a time-dependent component availability. In particular, simulating the plurality of dynamic events may include: modeling customer orders to arrive in a stochastic interval using a distribution function, the orders having at least one line item having at least one quantity, the at least one line item and at least one quantity being decided as the orders are generated in an order generation event, selecting a component to be a building block of a product using a distribution function representing a customer preference of component features, in consideration of a sourcing policy, and for a selected component, looking for a specified quantity starting from a current day to a future date until an availability of all quantities is identified.

Further, in the exemplary method, a lead time to a ship date may be given as an availability date when the availability of all quantities are identified, plus an estimated assembly time. Further, an availability quantity may change as a result of at least one of an order generation event, replenishment event, roll-forward event, and data refresh event.

For example, when a customer order reaches a task which simulates a customer submission of the customer order, specified availability quantities of components may be reserved for the order, and are decremented from a component availability. Further, the component availability may be replenished at a frequency and quantity which is a result of the supply planning. Further, as a simulation clock is moved from a day to a next day, an amount of component that has not been consumed may be carried forward to a day earlier.

Further, a ship date may be computed using a dynamic view of component availability and a static view of component availability. An accuracy of the ship date may be estimated based on a discrepancy between the dynamic view and the static view.

The present invention may also include a business method which includes a simulation for estimating a ship date profile for a business. The business method may include simulating a plurality of dynamic events to estimate the ship date profile (e.g., expected ship date profile) for the business, monitoring supply and demand data pertaining to an actual operation of the business by analyzing and forecasting customer demand, and planning a procurement of building components from suppliers, and feeding back the supply and demand data during a next simulation in order to revise the ship date profile (e.g., improve an accuracy of the estimated ship date profile).

The present invention also includes a tool (e.g., system, apparatus, computer-implemented tool, etc.) for estimating a ship date profile for a business, including: a simulator for simulating a plurality of dynamic events to estimate the ship date profile for the business.

In another exemplary aspect, the present invention includes a programmable storage medium tangibly embodying a program of machine-readable instructions executable by a digital processing apparatus to perform the inventive method of estimating a ship date profile for a business.

In another exemplary aspect, the present invention includes a method for deploying computing infrastructure in which computer-readable code is integrated into a computing system, such that the code and the computing system combine to perform the inventive method of estimating a ship date profile for a business.

With its unique and novel features, the present invention provides an efficient and effective method and tool for estimating a ship date profile for a business, by using a plurality of dynamic events.

BRIEF DESCRIPTION OF THE DRAWINGS

The foregoing and other exemplary purposes, aspects and advantages will be better understood from the following detailed description of the exemplary embodiments of the invention with reference to the drawings, in which:

FIG. 1 is a flowchart illustrating a method 100 of estimating a ship date profile for a business, according to the exemplary aspects of the present invention;

FIG. 2 illustrates a simulation of a ship date calculation according to the exemplary aspects of the present invention;

FIG. 7 illustrates a tool 700 for estimating a ship date profile for a business, according to the exemplary aspects of the present invention;

FIG. 8 illustrates a typical hardware configuration which may be used for implementing the inventive method and tool; and FIG. 9 illustrates a programmable storage medium 900 (e.g., floppy disk) tangibly embodying a program of machine-readable instructions executable by a digital processing apparatus to perform the inventive method.

Figure 3:
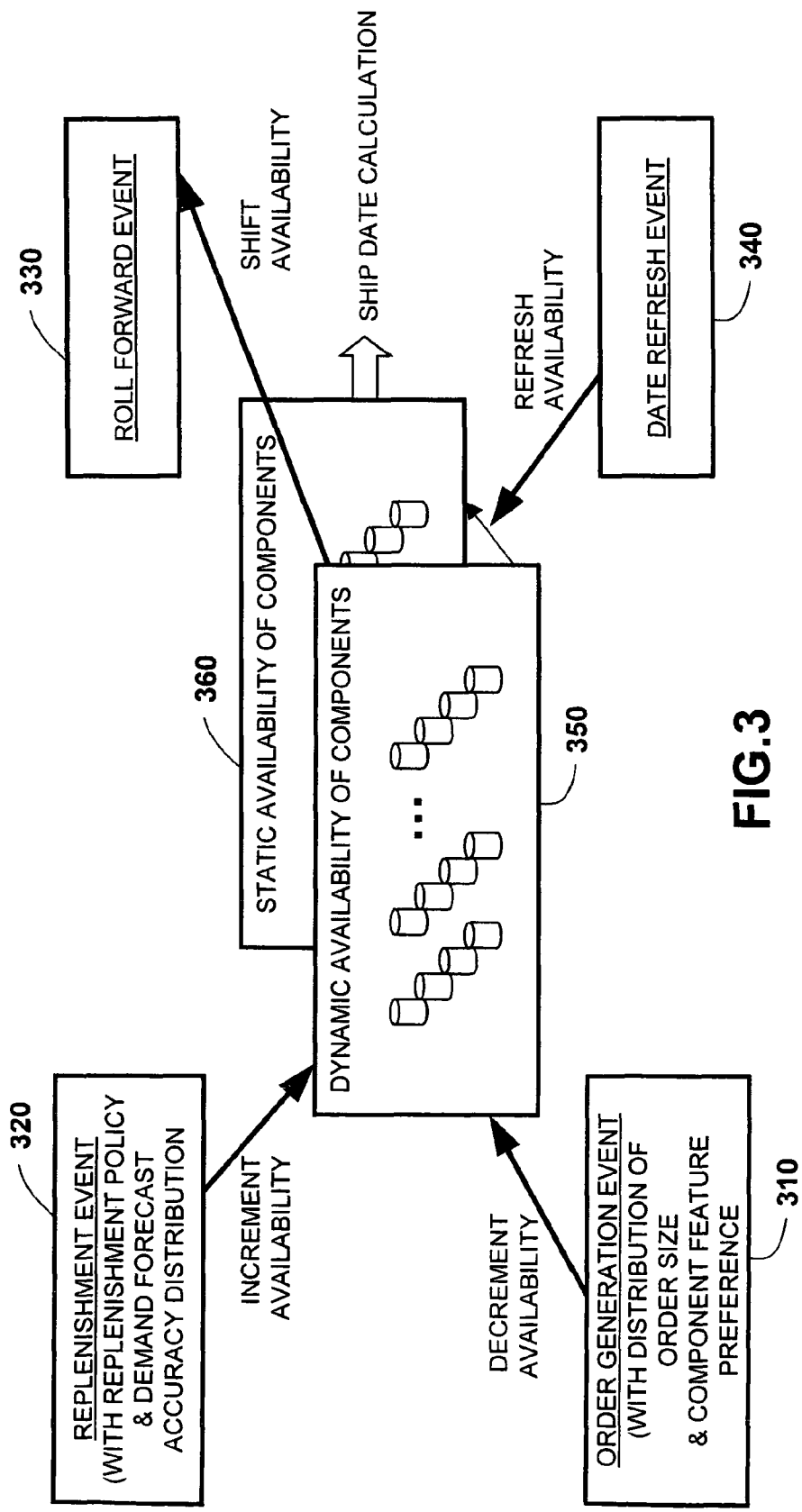
FIG. 3 is a flowchart that illustrates the events 310-340 that may affect the Availability of components, according to the exemplary aspects of the present invention.

DETAILED DESCRIPTION OF THE
EXEMPLARY EMBODIMENTS OF THE
INVENTION

Referring now to the drawings, FIG. 1 is a flowchart illustrating a method 100 of estimating a ship date profile for a business, according to the exemplary aspects of the present invention.

The method includes simulating (110) a plurality of dynamic events to estimate the expected ship date profile for the business. The plurality of dynamic events may include, for example, at least one of stochastic customer shopping traffic, uncertainty of order size, customer preference of a product feature and demand forecast, an inventory policy, a sourcing policy and a supply planning policy, and manufacturing lead time.

It should be noted that the term "business" as used herein should be broadly construed to include any form of concern. Thus, for example, the term "business" may include a corporation, partnership, joint venture, governmental entity such as an agency or municipality, not-for-profit organization, college or university, etc.

The present invention may use data derived from simulating these events, in order to estimate a ship date profile for the business. It should be noted that this list of events which may be simulated by the present invention is not exhaustive. That is, the invention may simulate other events in order to estimate the ship date profile. Further, although the accuracy of the estimated ship date profile may be improved by simulating all of these events, the present invention does not necessarily need to simulate all of these events to be functional. That is, any combination of these events may be simulated by the present invention in order to estimate a ship date profile for the business.

In the exemplary aspects of the present invention, a method and tool may be used to estimate a ship date profile (e.g., an expected ship date, effect of certain events on the ship date), and the accuracy of the estimated ship date profile (e.g., accuracy of an expected ship date) by simulating a plurality of events (e.g., simulating a business such as an e-commerce business). Such events may also include (e.g., for an e-commerce business) a frequency of data communications between the computer systems supporting the on-line business.

Customer service is one of most important factors of success and survival of enterprises in today's dynamic business environment. Being able to estimate customer service before investment is made to run the business is quite beneficial to any enterprises. The exemplary aspects of the present invention may estimate the ship dates, one of most important customer service factors in on-line sales business, and how accurate the estimated (e.g., promised) ship date is. By simulating various business scenarios and observing the resulting ship date statistics and comparing the costs of running the scenarios, intelligent business decisions can be made to promote higher profits and better customer services.

The exemplary aspects of the present invention were developed using a simulation engine of the new Websphere Business Integration (WBI) Business Modeler, of the assignee of the present application. It is possible that a modeling/simulation template of the present invention may be developed and marketed as a module of the WBI Business Modeler.

In general, the exemplary aspects of the present invention includes a method 100 of estimating a ship date profile for a business. For example, the method 100 may be used to estimate the expected ship dates (e.g., for a business such as an e-commerce business) where end products are configured from different components by customers. That is, where the customer may select features or options (e.g., color, size, materials, etc.) of the end product. This method 100 may operate, for example, by simulating the effect of stochastic customer shopping traffic, uncertainty of order size, customer preferences of product features and demand forecast, inventory policies, sourcing policies and supply planning policies, manufacturing lead time etc., on the profiles of ship dates.

The method 100 may further provide important statistical information pertaining to an estimated ship date profile (e.g., an expected ship date), before the business is put into operation so that intelligent business decisions are made before significant investment is made. The method 100 may also estimate the accuracy of the estimated ship date profile (e.g., ship dates determination) arising from frequency of data communications between the computer systems supporting the on-line business. For multiple quantity order, the method 100 may also compute ship dates for partial shipments, if it is optional, and the total shipment.

When the simulation model is used to predict the ship date profile of a business that is not in operation, or to predict a ship date profile for a product which is not yet being sold or leased, the uncertainty of events, such as arrival of e-shoppers, supply planning, demand forecast and customer preference of product feature etc., may be estimated by appropriate probability distribution functions using best judgment.

When a business process is thereafter put into an actual operation, those uncertainties can be replaced by more realistic data as they become available or are generated from specific business systems such as a demand management system and a supply planning system. For example, a demand event such as an order generation event (e.g., an event in which a customer places an order) can be replaced by an actual demand management system, and the replenishment (e.g., supply planning) event can be replaced by an actual supply planning system.

For example, the simulating (110) may include generating a business model for the business. As the business model (e.g., a simulation model) evolves by incorporating actual business data, the ship date profile computed from the method 100 (e.g., simulation method) may become more accurate.

For example, the present invention may include a computer-implemented method of estimating expected ship dates of e-commerce businesses by simulating the business operations. As noted above, the method may take into consideration dynamic events such as stochastic customer shopping traffics, uncertainty of order size, customer preferences of product features and demand forecast, policies of sourcing and supply planning, manufacturing lead time and the like.

The invention may also include a computer-implemented method of estimating ship dates for a partial shipment as well as the total shipment, for orders with multiple quantities, by simulating the business operations. Further, the invention may include a computer-implemented method of estimating the accuracy of ship date determination by simulating data communication between computer systems.

The invention may also include a method of updating inputs to the ship date simulation model by feeding back (e.g., for consideration in a next simulation) actual business data and/or output from business planning tools to continuously improve the accuracy of the model and to better estimate the ship date profile.

Component Availability

FIG. 2 illustrates a simulation of a ship date calculation according to the exemplary aspects of the present invention. Specifically, FIG. 2 illustrates an example of a multidimensional data array 200 which may be used in simulating (110) a plurality of dynamic events (e.g, simulating a business operation).

As illustrated in FIG. 2, availability quantities of components that constitute the finished products are represented by the multi-dimensional data array 200, with a dimension of number of components by number of time periods, shown as cylinders. The availability is time-dependent. For example, there is availability for the current day (t=1), and there are availabilities for future days (t=2, 3, . . . ) as the components are expected to be replenished in the future dates. For example, in the example of FIG. 2, component 1 is available in a quantity of 3 in the current day, and 5 more are expected to be available a day after, and 10 more are expected be available for 2 days later and so on.

The availability quantities of components may be used in computing the ship date of customer request and orders. The availability quantity (e.g., component availability quantity) may change as a result of events (e.g., four discrete events) in the simulation. Specifically, the availability quantity may change as a customer order is released, as replenishment is done, as data refresh is done, and as roll forward is carried out, etc.

There may be two instances of component availability arrays, one representing the availability at real time (e.g., dynamic view of availability), and another representing known availability according to the content of availability database (e.g., static view of availability) at the time of availability calculation.

The static view of availability may be refreshed by a batch processing schedule as a result of the delay in the fulfillment process. For example, the availability data can be refreshed every few minutes or hours. Further, the discrepancy between the dynamic view of availability data and static view of availability data may be the cause of the accuracy of ship date calculation. That is, the accuracy of a estimated ship date profile may be based on the difference between the dynamic view and the static view of availability.

Ship Date Calculation

FIG. 2 further illustrates how the method 100 may simulate the dynamic events (e.g., simulation of ship date calculation, simulation of business operations, etc.). Customer orders or requests arrive in intervals (e.g., certain stochastic intervals) as modeled with certain distribution functions such as normal or Weibull distribution. The orders (e.g., order 231, order 232, etc.) may have one or more line items (e.g., items 1, 2 and 3), and each line item has one or more quantities. The orders may be modeled, for example, using a probability distribution function.

The line items and quantities may be decided as an order is generated in the order generation event (details described in the next section). For example, as a current order or request arrives in the simulation model, for each line item, certain components may be selected as the building blocks of the product using a distribution function representing customer preference of component features.

For example, in the FIG. 2, the line item #3 of the order #231, requires components 1, 3 and 4. At this point, different sourcing policies can also be applied in selecting specific components since components can be treated to exist in different pools, each of which is designated as specific availability for specific geographic sales region or customer class. For each chosen component, the simulation model looks for specified quantity starting from the current day to future dates until the availability of all quantity is identified.

For example, for the component #1, the requested quantity of 10 is identified in the first 3 days; 3 in day 1 (t=1), 5 in day 2 (t=2), and 2 in day 3 (t=3). Therefore, for the line item #3, the required quantity of component 1 is available by the third day.

A similar search may be carried out for component #3, which is available on the first day, and for component #4, which is available by the second day. Therefore, the component availability of line item #3 of the order #231 is the 3rd day.

For example, in the exemplary aspects of the invention illustrated in FIG. 2, the availability calculated for the line item #1 is the 8th day, and that of the line item #2 is the 1st day. When the components (e.g., all components) are available, the product is assembled or manufactured which takes time. The time needed for assembly/manufacture can be a fixed number of days or can be described with a distribution function. The lead time to ship date may then calculated by adding the manufacturing (assembly) time to the availability day.

For example, assuming that the manufacturing lead time for the example illustrated in FIG. 2 is 2 days, then the partial ship date for item #1 is the 10th day, for item #2 it is the 3rd day, and for item #3 it is the 5th day, if the customer is willing to receive the partial shipments. The total order estimated ship date is the 10th day.

Event Generation

FIG. 3 is a flowchart that illustrates the events 310-340 that may affect the availability of components.

As explained above, the ship date of customer requests and orders are calculated using the availability quantities of components during a shopping (e.g., e-shopping) experience as requested or at the time of order placement. In the method 100, the availability quantity changes as the result of dynamic events. Namely, the availability quantity may be changed as a result of four events (e.g, dynamic events, discrete events), order generation event 310, replenishment event 320, roll-forward event 330, and data refresh event 340.

The dynamic events may be generated independently using probability distribution functions or fixed intervals. In addition, the business model generated in simulating the dynamic events can be easily extended to include more events.

(1) Order Generation Event

Customer orders may be generated in the present invention in intervals (e.g., in certain stochastic intervals) as the orders are modeled with certain distribution functions such as normal or Weibull distribution. At the time of order generation, each order is assigned with one or more line items, and each line item is assigned with one or more quantities. The assignment of attributes to each customer order may be modeled with probability distribution functions based on historic sales data or expected business in the future.

The customer orders may travel through the business process as defined in the simulation model, and when the orders reach a task which simulates the customer submission of the order, a specified availability quantity of components may be reserved for the order, and may be decremented from the availability. The allocation of specific components may be decided, for example, by the sourcing policy, distribution of component feature preference, customer class etc.

(2) Replenishment Event

As building block components are consumed as products are sold to customers, additional components may be acquired, for example, through planning of supply (e.g., supply planning). Supply planning may occur, for example, in advance (e.g., months, weeks or days) of a time when the components are actually needed, to accommodate the supply lead time. The frequency of supply planning can be given periodically (e.g., monthly, weekly or daily).

As a result of supply planning, the component availability may be replenished (e.g., in a certain frequency and quantity). The replenishment frequency can be a fixed interval such as daily, weekly etc, or it can be modeled, for example, by using a distribution function. The replenishment quantity may be based on the forecast of customer demand, which has uncertainty. The replenishment quantity may be modeled using a distribution function (e.g., typically a normal distribution with certain mean and standard deviation, which represent the uncertainty of demand forecast).

In the present invention, historic demand distribution data may be used to arrive at the distribution function. In this case, various replenishment policies can be modeled to specify the frequency and size of the replenishment.

(3) Roll Forward Event

As a simulation clock (e.g., a clock in the simulated business operation) is moved from one day to a next day, the component that has not been consumed may be carried forward to a day earlier. For example, the availability quantity for the 2nd day will be the availability quantity of 1st day, and that of the 3rd day will be that of the 2nd day, etc. In addition, the availability quantity which is not consumed on the 1st day may be maintained (e.g., stayed) on the same day, assuming it is non-perishable. The roll forward event can be generated in a fixed interval (e.g., daily), or different roll forward events can also be modeled based on the business environment.

(4) Data Refresh Event

In an ideal business (e.g., e-business) environment, when a customer order for a specific product is accepted, the components that constitute the product should immediately be reserved and not available for future orders. However, in reality the availability data are not updated in real time.

One of the reasons is that several computer systems may be involved in processing and fulfilling customer orders, and their data are not updated and synchronized in real time because it is expensive to have IT architecture that ensures such data communication and synchronization. Another reason is that the order fulfillment process, which may include scheduling, production, distribution and accounting etc., takes some time or is done typically as a batch process, which is processed in certain time intervals, and the availability data may be updated only after the fulfillment process is completed.

The discrepancy between the real availability (dynamic availability) and the known availability (static availability) causes the accurate ship date calculation. In the present invention, the ship date is computed using both dynamic view 350 of component availability and static view 360 of component availability, as shown in the FIG. 3, and the inaccuracy of the ship date calculation is estimated (it should be noted that the inaccuracy of ship date calculation may be an important indication of customer service level). The data refresh event can be modeled as fixed interval event or randomly generated event described by distribution functions.

Sample Ship Date Profile from Simulation Run

Figure 4:
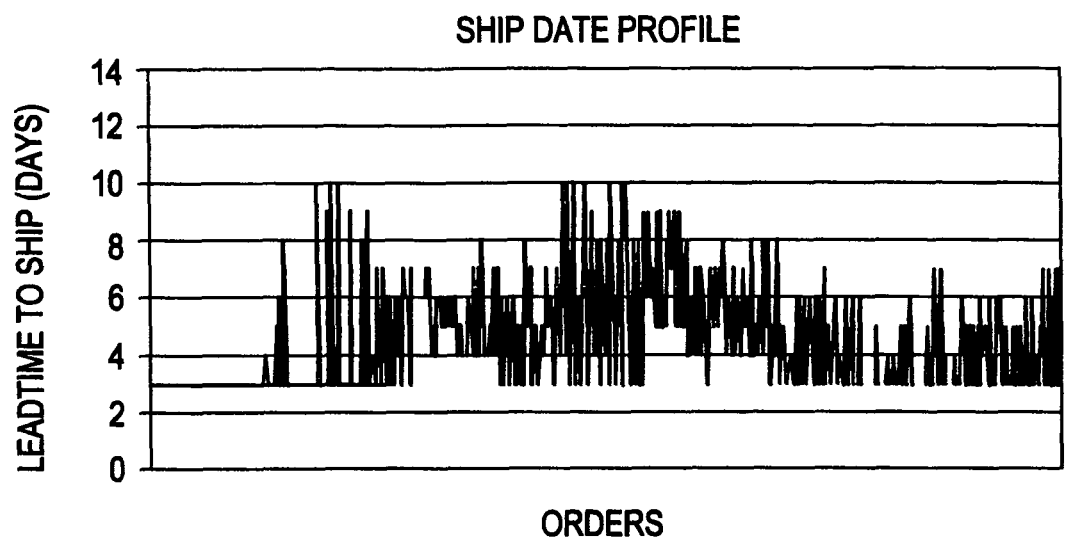
FIG. 4 is a chart (plot) illustrating an example of an estimated ship date profile over time as a result of a simulation run using the method 100, according to the exemplary aspects of the present invention.

FIG. 4 is a chart illustrating an example of an estimated ship date profile over time as a result of a simulation run using the method 100, in actual experiments performed by the inventors. As illustrated in the example of FIG. 4, an estimated ship date may fluctuate between 3 days and 10 days with a mean ship date of 4.4 days and a standard deviation of 1.76 days.

Figure 5:
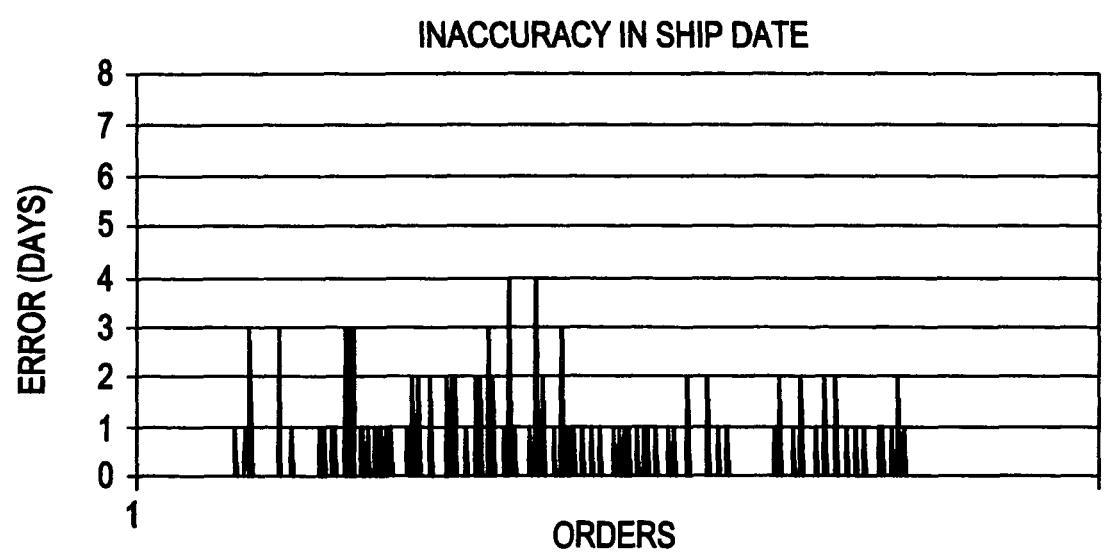
FIG. 5 is a chart (plot) illustrating the accuracy (e.g., inaccuracy or error) of the exemplary ship date calculation illustrated in FIG. 4.

Further, FIG. 5 is a chart illustrating the accuracy (e.g., inaccuracy or error) of the exemplary ship date calculation of FIG. 4 based on the availability data refresh frequency of 8 hours. In this example, the ship date is inaccurate by as much as 4 days, and 8% of customer requests or orders will have an incorrect ship date.

Closed Feedback Loop to Simulation Model for Continuous Process Improvement

As noted above, in the method 100 of the present invention, a plurality of dynamic event data may be simulated using a simulation model in order to predict (e.g., estimate) the ship date profile of a business. For example, the method 100 may be used to predict a ship date profile for a business which is not in operation, or to predict a ship date profile for a product that has not been sold or leased, or to predict a ship date profile for a product that has been sold or leased in a different market, manner, etc. so that empirical ship date data (e.g., customer demand, etc) is not available.

Specifically, in the method 100 of the present invention, the uncertainty of events, such as arrival of customers (e.g., e-shoppers), supply planning, demand forecast and customer preference of product feature etc., may be estimated by appropriate probability distribution functions using best judgment.

Figure 6:
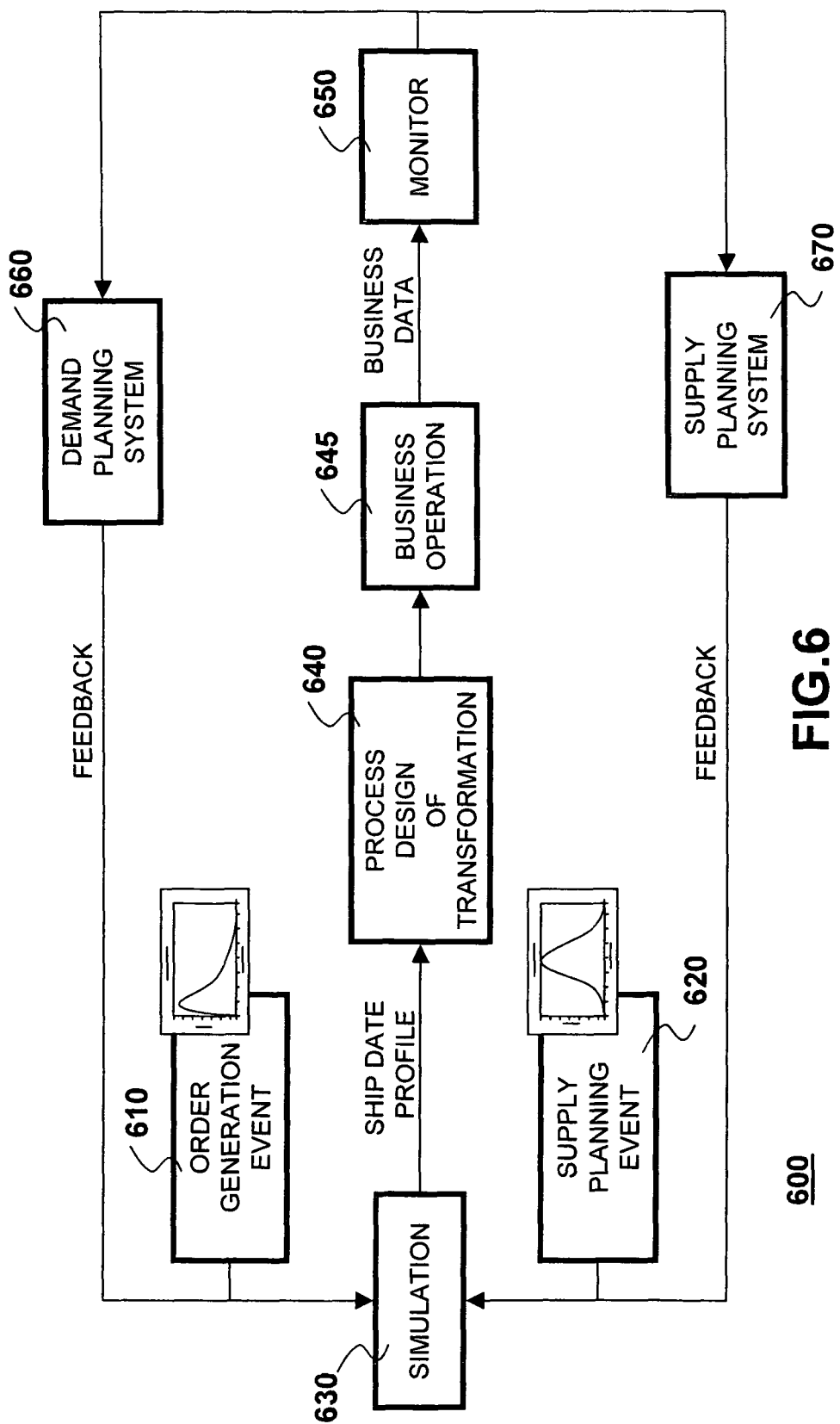
FIG. 6 is a flowchart illustrating a method 600 including a closed feedback loop for continuous process improvement, according to the exemplary aspects of the present invention.

Further, FIG. 6 is a flowchart illustrating a method 600 including a closed feedback loop for continuous process improvement. In particular, the flowchart in FIG. 6 illustrates how the inventive method may be implemented as part of the closed feedback loop.

In the exemplary embodiment illustrated in FIG. 6, distribution functions representing an order generation event 610 and a supply planning event 620 along with other information may be used to run a simulation 630. The simulation run 630 may simulate a plurality of dynamic events in order to estimate (e.g., generate) a ship date profile (e.g., along with other useful information such as inventory profile etc.).

Using the information generated (e.g., the estimated ship date profile, etc.) the business process is designed or transformed 640. Further, when a business process is put into an actual operation 645, certain business data, such as detailed sales activity, customer behavior and component supply etc., may be carefully monitored 650.

Based on the monitored data, customer demand may be analyzed and forecasted (e.g., in a demand planning system 660), and procurement of building components from suppliers may be planned (e.g., in a supply planning system 670). These demand and supply data are likely more accurate than the probability distributions that were used in the initial simulation study, and therefore, the subsequent simulation analysis may be done using this newly obtained data. That is, data generated in the demand and supply planning systems may be fed back for use in a next simulation run.

Thus, the simulation model may evolve by incorporating the actual business data which is likely more accurate, so that the ship date profile estimated (e.g., computed) in the simulation run 630 would likely become more accurate. Therefore, better business decisions can be made to improve the business process. Thus, the closed feedback scheme illustrated in the method 600 of FIG. 6 may promote a continuous improvement of the business process.

Referring now to FIG. 7, the present invention further includes a tool 700 for estimating a ship date profile for a business. The tool 700 includes a simulator 710 for simulating a plurality of dynamic events to estimate the ship date profile for the business. The simulator 710 may include, for example, one or more computers (e.g., a network of computers) for implementing the method of estimating a ship date profile for a business as described above. In particular, the simulator 700 may include a graphical user interface (GUI) which may include, for example, a display device, processor, keyboard and mouse, and memory device which may be used to estimate a ship date for a business.

For example, FIG. 8 illustrates a typical hardware configuration which may be used for implementing the inventive method and tool for estimating a ship date profile for a business according to the exemplary aspects of the present invention. The configuration has preferably at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, and Intranet, a personal area network (PAN), etc., and a display adapter 836 for connecting the bus 812 to a display device 838 and/or printer 839. Further, an automated reader/scanner 841 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 811 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 500 (FIG. 9), directly or indirectly accessible by the CPU 811.

Whether contained in the computer server/CPU 811, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.). In an illustrative embodiment of the invention, the machine-readable instructions may comprise software object code, complied from a language such as C+, C++, etc.

With its unique and novel features, the present invention provides an efficient and effective method and tool for estimating a ship date profile for a business, by using a plurality of dynamic events which may include, for example, at least one of stochastic customer shopping traffic, uncertainty of order size, customer preference of a product feature and demand forecast, an inventory policy, a sourcing policy and a supply planning policy, and manufacturing lead time.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim in the present application should be construed as a disclaimer of any interest in or right to an equivalent of any element or feature of the amended claim.

What is claimed is:

1. A computer-implemented method of estimating a ship date profile for a business, comprising:
   simulating a business operation by using a computer processor, said simulating comprising:
      modeling orders for a product including plural components by using a distribution function;
      representing availability quantities of the components by a multi-dimensional array having entries comprising a time-dependent component availability, the array comprising plural rows representing the components and plural columns representing plural times, and an entry in the array being located at an intersection of a row of the plural rows and a column of the plural columns and comprising a numerical value representing a quantity of a component represented by the row which will be available for shipment at a time represented by the column;
      simulating a plurality of dynamic events; and
      changing the availability quantities of the components based on the simulated plurality of dynamic events;
   estimating said ship date profile for said business using data derived from said simulated business operation; and
   estimating an accuracy of the estimated ship date profile, the accuracy of said estimated ship date profile being computed using a dynamic view of said component availability and a static view of said component availability, and the accuracy being based on a difference between the dynamic view and the static view of said component availability.

2. The computer-implemented method according to claim 1, wherein said business comprises a business which is not in operation at a time of said simulating said business operation.

3. The computer-implemented method according to claim 1, wherein said ship date profile comprises a ship date profile for a product that is not being one of sold and leased by said business at a time of said simulating said business operation by considering said plurality of dynamic events.

4. The computer-implemented method according to claim 1, wherein said estimating said ship date profile comprises using only data from said simulating said business operation.

5. The computer-implemented method according to claim 1, wherein said plurality of dynamic events comprises at least one of stochastic customer shopping traffic, an uncertainty of order size, a customer preference of a product feature and demand forecast, an inventory policy, a sourcing policy, a supply planning policy, and a manufacturing lead time.

6. The computer-implemented method according to claim 1, wherein said business comprises an e-commerce business.

7. The computer-implemented method according to claim 6, wherein said plurality of dynamic events further comprises a frequency of data communications between computer systems supporting said e-commerce business.

8. The computer-implemented method according to claim 1, wherein said business comprises a non-existing business and said plurality of dynamic events are generated by appropriate probability distribution functions using best judgment.

9. The computer-implemented method according to claim 1, wherein said simulated business operation comprises a business operation in which a simulated customer selects at least one feature of a product which is at least one of sold and leased by said business.

10. The computer-implemented method according to claim 1, wherein said simulating said business operation comprises simulating an effect of said plurality of dynamic events on said ship date profile.

11. The computer-implemented method according to claim 1, wherein said ship date profile comprises a ship date for one of a partial shipment and a total shipment.

12. The computer-implemented method according to claim 1, wherein said simulating the business operation comprises generating a business model for the business, and
   wherein the method further comprises:
      updating said business model by replacing at least some estimated data associated with said plurality of dynamic events with actual event data, such that the accuracy of said estimated ship date profile for said business improves as said business model evolves.

13. The method computer-implemented according to claim 1, wherein said simulating the business operation comprises generating a business model for the business, and
   wherein the method further comprises:
      updating said business model by feeding back data associated with said ship date profile into a next simulation of said business operation by considering said plurality of dynamic events.

14. The computer-implemented method according to claim 1, wherein the modeling of the orders, the representing of the availability quantities, the simulating of the plurality of dynamic events, the changing of the availability quantities are performed by using the computer processor.

15. The computer-implemented method according to claim 14, wherein the estimating of the ship date profile, and the estimating of the accuracy of the estimated ship date profile are performed by using a computer processor.

16. A computer-implemented method which includes a simulation for estimating a ship date profile for a business, said business method comprising:
  simulating a business operation by using a computer processor, said simulating comprising:
    modeling orders for a product including plural components by using a distribution function;
    representing availability quantities of the components by a multi-dimensional array having entries comprising a time-dependent component availability, the array comprising plural rows representing the components and plural columns representing plural times, and an entry in the array being located at an intersection of a row of the plural rows and a column of the plural columns and comprising a numerical value representing a quantity of a component represented by the row which will be available for shipment at a time represented by the column;
    simulating a plurality of dynamic events; and
    changing the availability quantities of the components based on the simulated plurality of dynamic events;
  estimating said ship date profile for said business using data derived from said simulated business operation;
  monitoring supply and demand data pertaining to an actual operation of said business by analyzing and forecasting customer demand, and planning a procurement of building components from suppliers;
  feeding back said supply and demand data during a next simulation in order to revise said estimated ship date profile; and
  estimating an accuracy of the estimated ship date profile, the accuracy of said estimated ship date profile being computed using a dynamic view of said component availability and a static view of said component availability, and the accuracy being based on a difference between the dynamic view and the static view of said component availability.

17. The computer-implemented method according to claim 16, wherein said estimated ship date profile is revised to improve the accuracy of said estimated ship date profile.

18. A computer-implemented tool for estimating a ship date profile for a business, comprising:
  a simulator for simulating a business operation by using a computer processor, said simulating comprising:
    modeling orders for a product including plural components by using a distribution function;
    representing availability quantities of the components by a multi-dimensional array having entries comprising a time-dependent component availability, the array comprising plural rows representing the components and plural columns representing plural times, and an entry in the array being located at an intersection of a row of the plural rows and a column of the plural columns and comprising a numerical value representing a quantity of a component represented by the row which will be available for shipment at a time represented by the column;
    simulating a plurality of dynamic events; and
    changing the availability quantities of the components based on the simulated plurality of dynamic events;
  an estimator for estimating said ship date profile for said business using data derived from said simulated business operation; and
  an estimator for estimating an accuracy of the estimated ship date profile, the accuracy of said estimated ship date profile being computed using a dynamic view of said component availability and a static view of said component availability, and the accuracy being based on a difference between the dynamic view and the static view of said component availability.

19. A computer-implemented method of estimating a ship date of an e-commerce business, said method comprising:
  simulating a business operation by using a computer processor, said simulating comprising:
    modeling orders for a product including plural components by using a distribution function;
    representing availability quantities of the components by a multi-dimensional array having entries comprising a time-dependent component availability, the array comprising plural rows representing the components and plural columns representing plural times, and an entry in the array being located at an intersection of a row of the plural rows and a column of the plural columns and comprising a numerical value representing a quantity of a component represented by the row which will be available for shipment at a time represented by the column;
    simulating a plurality of dynamic events; and
    changing the availability quantities of the components based on the simulated plurality of dynamic events, said dynamic events comprising at least one of stochastic customer shopping traffics, an uncertainty of order size, a customer preference of product features and demand forecast, policies of sourcing and supply planning, and a manufacturing lead time;
  estimating a ship date profile using data from said simulated business operation; and
  estimating an accuracy of the estimated ship date profile, the accuracy of said estimated ship date profile being computed using a dynamic view of said component availability and a static view of said component availability, and the accuracy being based on a difference between the dynamic view and the static view of said component availability.

20. The computer-implemented method of claim 19, wherein said simulating said business operation comprises simulating said business to estimate ship dates for a partial shipment and a total shipment for orders with multiple quantities.

21. The computer-implemented method of claim 19, wherein the estimating of the accuracy of the ship date profile comprises simulating data communication between computer systems.

22. The computer-implemented method of claim 19, further comprising:
  updating inputs to a ship date simulation model used in said simulating said business operation by feeding back actual business data and output from business planning tools to continuously revise the ship date profile for said business.

23. A programmable storage medium tangibly embodying a program of machine-readable instructions executable by a digital processing apparatus to perform a method of estimating a ship date profile for a business, said method comprising:

simulating a business operation by using a computer processor, said simulating comprising:
  modeling orders for a product including plural components by using a distribution function;
  representing availability quantities of the components by a multi-dimensional array having entries comprising a time-dependent component availability, the array comprising plural rows representing the components and plural columns representing plural times, and an entry in the array being located at an intersection of a row of the plural rows and a column of the plural columns and comprising a numerical value representing a quantity of a component represented by the row which will be available for shipment at a time represented by the column;
  simulating a plurality of dynamic events; and
  changing the availability quantities of the components based on the simulated plurality of dynamic events;
estimating said ship date profile for said business using data derived from said simulated business operation; and
estimating an accuracy of the estimated ship date profile, the accuracy of said estimated ship date profile being computed using a dynamic view of said component availability and a static view of said component availability, and the accuracy being based on a difference between the dynamic view and the static view of said component availability.

24. A computer-implemented method of estimating a ship date profile for a business, comprising:
simulating a business operation by using a computer processor, said simulating comprising:
  modeling orders for a product including plural components by using a probability distribution function;
  representing availability quantities of the components by a multi-dimensional array having entries comprising a time-dependent component availability, the array comprising plural rows representing the components and plural columns representing plural times, and an entry in the array being located at an intersection of a row of the plural rows and a column of the plural columns and comprising a numerical value representing a quantity of a component represented by the row which will be available for shipment at a time represented by the column;
  simulating a plurality of dynamic events; and
  changing the availability quantities of components based on the simulated plurality of dynamic events;
estimating said ship date profile for said business using data derived from said simulated business operation;
estimating an accuracy of said estimated ship date profile, the accuracy of said estimated ship date profile being computed using a dynamic view of said component availability and a static view of said component availability, and the accuracy being based on a difference between the dynamic view and the static view of said component availability; and
updating said business model by replacing at least some estimated data associated with said plurality of dynamic events with actual event data, such that said accuracy of said ship date profile for said business improves as said business model evolves,
wherein said plurality of dynamic events comprises stochastic customer shopping traffic, an uncertainty of order size, a customer preference of a product feature and demand forecast, an inventory policy, a sourcing policy, a supply planning policy, and a manufacturing lead time.

25. The computer-implemented method according to claim 1, wherein said simulating the plurality of dynamic events includes:
  modeling customer orders to arrive in a stochastic interval using a distribution function, the orders having at least one line item and having at least one quantity, the at least one line item and at least one quantity being decided as the orders are generated in an order generation event; and
  selecting a component to be a building block of a product using a distribution function representing a customer preference of component features, in consideration of a sourcing policy, and for a selected component, looking for a specified quantity starting from a current day to a future date until an availability of all quantities is identified,
  wherein a lead time to a ship date is given as an availability date when an availability of all quantities are identified, plus an estimated assembly time, and an availability quantity changes as a result of at least one of an order generation event, replenishment event, roll-forward event, and data refresh event,
  wherein if a customer order reaches a task which simulates a customer submission of the customer order, specified availability quantities of components are reserved for the order, and are decremented from a component availability, and
  wherein the component availability is replenished at a frequency and quantity which is a result of the supply planning, and as a simulation clock is moved from a day to a next day, an amount of component that has not been consumed is carried forward to a day earlier.

26. The computer-implemented method according to claim 1, wherein said ship date profile comprises a ship date for one of a partial shipment and a total shipment,
wherein said simulating the business operation comprises generating a business model for the business,
wherein the method further comprises:
  updating said business model by feeding back data associated with said ship date profile into a next simulation of said business operation by considering said plurality of dynamic events.

27. The computer-implemented method according to claim 26, wherein said simulating the plurality of dynamic events includes:
  modeling customer orders to arrive in a stochastic interval using a distribution function, the orders having at least one line item and having at least one quantity, the at least one line item and at least one quantity being decided as the orders are generated in an order generation event.

28. The computer-implemented method according to claim 27, wherein said simulating the plurality of dynamic events further includes:
  selecting a component to be a building block of a product using a distribution function representing a customer preference of component features, in consideration of a sourcing policy, and for a selected component, looking for a specified quantity starting from a current day to a future date until an availability of all quantities is identified.

29. The computer-implemented method according to claim 28, wherein a lead time to a ship date is given as an availability date when an availability of all quantities are identified, plus an estimated assembly time, and an availability quantity changes as a result of at least one of an order generation event, replenishment event, roll-forward event, and data refresh event, wherein if a customer order reaches a task which simulates a customer submission of the customer order, specified availability quantities of components are reserved for the order, and are decremented from a component availability, and wherein the component availability is replenished at a frequency and quantity which is a result of the supply planning, and as a simulation clock is moved from a day to a next day, an amount of component that has not been consumed is carried forward to a day earlier.

* * * * *